US011301059B2

(12) United States Patent
Klein et al.

(10) Patent No.: US 11,301,059 B2
(45) Date of Patent: Apr. 12, 2022

(54) GESTURE RECOGNITION SYSTEM HAVING ORIGIN RESETTING MEANS

(71) Applicant: Kano Computing Limited, London Middlesex (GB)

(72) Inventors: Alex Klein, London Middlesex (GB); Peter Griffith, London Middlesex (GB)

(73) Assignee: Kano Computing Limited, London Middlesex (GB)

( * ) Notice: Subject to any disclaimer, the term of this patent is extended or adjusted under 35 U.S.C. 154(b) by 0 days.

(21) Appl. No.: 17/263,067

(22) PCT Filed: Jul. 24, 2019

(86) PCT No.: PCT/GB2019/052077
§ 371 (c)(1),
(2) Date: Jan. 25, 2021

(87) PCT Pub. No.: WO2020/021262
PCT Pub. Date: Jan. 30, 2020

(65) Prior Publication Data
US 2021/0165506 A1 Jun. 3, 2021

(30) Foreign Application Priority Data
Jul. 24, 2018 (GB) .................................... 1812080

(51) Int. Cl.
*G06F 3/0346* (2013.01)
*G06F 3/01* (2006.01)
*G06F 3/038* (2013.01)

(52) U.S. Cl.
CPC ............ *G06F 3/0346* (2013.01); *G06F 3/017* (2013.01); *G06F 3/038* (2013.01)

(58) Field of Classification Search
CPC ........ G06F 3/017; G06F 3/0346; G06F 3/038; G06F 3/0481; G06F 3/03545;
(Continued)

(56) References Cited

U.S. PATENT DOCUMENTS

2005/0212749 A1\* 9/2005 Marvit .................. G06F 3/0346
345/156
2005/0212754 A1 9/2005 Marvit et al.
(Continued)

FOREIGN PATENT DOCUMENTS

EP 2079004 A1 7/2009
EP 2887184 A1 6/2015

OTHER PUBLICATIONS

Written Opinion of the International Searching Authority from International Application No. PCT/GB2019/052077, dated Feb. 7, 2020.
(Continued)

*Primary Examiner* — Richard J Hong
(74) *Attorney, Agent, or Firm* — Leydig, Voit & Mayer, Ltd.; Gerald T. Gray (57) ABSTRACT

A gesture recognition system 1 comprises a gesture controller 10 and a computing device 20. The controller 10 is designed to be held by a user such that motion of the controller 10 by the user enables gesture control inputs to be made to computing device 20. In use, a display unit 28 of computing device is operable to provide visible feedback on the motion of controller 10 in the form of a cursor 31, the cursor moving in response to controller 10 motion. The system 1 is operable to enable the cursor 31 position to be reset to an origin 33 in response to a reset input. In addition to resetting the cursor 31 position, the system can define the current orientation of the controller 10 as a new origin orientation.

26 Claims, 3 Drawing Sheets

(58) Field of Classification Search
CPC ................. G06F 3/0482; A63F 13/235; H04N 21/42204; H04N 21/42222
See application file for complete search history.

(56) References Cited

U.S. PATENT DOCUMENTS

| | | | |
|---|---|---|---|
| 2006/0267966 A1* | 11/2006 | Grossman | G06F 3/03545 345/179 |
| 2008/0291160 A1 | 11/2008 | Rabin | |
| 2011/0090407 A1* | 4/2011 | Friedman | H04N 21/42222 348/734 |
| 2011/0169734 A1* | 7/2011 | Cho | H04N 21/42204 345/157 |
| 2012/0066624 A1* | 3/2012 | Kwak | G06F 3/0481 715/765 |
| 2012/0194427 A1 | 8/2012 | Lee et al. | |
| 2012/0319503 A1* | 12/2012 | Johnson | H04N 21/42222 307/119 |
| 2014/0092011 A1 | 4/2014 | De Foras et al. | |
| 2015/0169075 A1 | 6/2015 | Peixoto | |
| 2016/0018902 A1 | 1/2016 | Nasiri et al. | |
| 2016/0154466 A1* | 6/2016 | Wang | G06F 3/0482 345/173 |
| 2017/0093848 A1* | 3/2017 | Poisner | A63F 13/235 |

OTHER PUBLICATIONS

Search Report from Application GB1812080.8 from Intellectual Property Office, dated Jan. 25, 2019.
International Search Report from International Application No. PCT/GB2019/052077, dated Feb. 7, 2020.

* cited by examiner

GESTURE RECOGNITION SYSTEM HAVING ORIGIN RESETTING MEANS

CROSS REFERENCES

This application claims priority to International Application No. PCT/GB2019/052077 by Klein et al. entitled, "GESTURE RECOGNITION SYSTEM," filed Jul. 24, 2019, and United Kingdom Application No. 1812080.8, by Klein et al. entitled "GESTURE RECOGNITION SYSTEM," filed Jul. 24, 2018. Both applications are incorporated in their entirety herein by reference.

TECHNICAL FIELD OF THE INVENTION

The present invention relates to gesture recognition systems and in particular to gesture recognition systems operable to sense different user gestures in order to control the operation of a computing device.

BACKGROUND TO THE INVENTION

It is known for games systems, VR (virtual reality) systems or the like to provide controllers which allow users to control interactions. Simple controllers comprise one or more user actuable inputs and are operable to communicate signals to a linked system indicative of the user actuation of inputs.

In more recent times, some controllers have incorporated motion sensing, typically in the form of a 6-axis motion sensor combining a 3-axis accelerometer with a 3-axis gyroscope. In such controllers, the motion of the controller, being representative of the motion of a user holding the controller or a gesture performed by a user holding the controller, can provide a control input to the linked system. Performance of particular pre-set gestures using the controller enables activation (or other control) of features within the linked system. This can provide pleasing and intuitive control of the linked system for a user. Nevertheless, such pre-set control can be restrictive to a user or can provide problems if a user finds it difficult to perform a particular gesture.

Typically, some processing of the motion sensor output is carried out by the controller. This therefore requires the provision of a processing unit. This can increase the cost and complexity of the controller. Additionally, the provision of a processing unit can increase power consumption in the controller thereby requiring a higher capacity power source further increasing cost, complexity and potentially the size of the controller.

A further issue is that calibration of such controllers can drift over time or that a user can become confused as to the controller orientation. Accordingly, many existing controllers provide for calibration by use of external reference points and/or by an alternative sensing system such as optical sensing. Whilst this can improve calibration of the controller, it does require additional equipment beyond motion sensors thus adding to the cost and complexity of the controller. It is also not especially quick and convenient.

It is therefore an object of the present invention to provide a gesture recognition system that at least partially overcomes or alleviates the above problems.

SUMMARY OF THE INVENTION

According to a first aspect of the present invention there is provided a gesture recognition system comprising a gesture controller and a computing device: the gesture controller comprising: a motion sensor operable to sense motion of the controller and output a signal indicative thereof; a user actuable gesture mode input means; and a communication unit operable to communicate output of the motion sensor and the gesture mode input means to the computing device; the computing device comprising: a communication unit operable to receive the output of the motion sensor and the gesture mode input means from the communication unit of the gesture controller; a processing unit operable to process the output of the motion sensor and the gesture mode input means; and a display unit operable in response to the processor to provide visual feedback related to the output of the motion sensor, the visual feedback comprising a cursor on the display unit and wherein the cursor can be reset to an origin position in response to the output of the gesture mode input means.

The above system therefore enables ready use of gestures as control inputs. It also enables a user to readily redefine the current position of the controller as an origin position by use of the gesture mode input means. The user therefore does not need to undertake a complex recalibration. As a result, the user can readily ensure gestures are performed recognisably, no matter what the orientation of the controller is to the computing device when first picked up. Furthermore, the provision of the processing unit on the computing device enables the construction of the gesture controller to be relatively simple, inexpensive and lowers power consumption of the controller.

In addition to resetting the cursor to an origin position, the orientation of the controller when the cursor is rest may be defined as an origin orientation. In some embodiments, motions of the controller along one axis with respect to the origin position do not generate corresponding cursor motion on the display unit. In other embodiments, motions of the controller along one axis with respect to the origin position correspond to variation in the size of the displayed cursor.

The communication units of the gesture controller and computing device may be operable to communicate data over any suitable wired or wireless communication link. In preferred embodiments, the communication link is a wireless communication link. This has the benefit of ensuring wires associated with the communication link do not inhibit gesture performance. The wireless communication link may operate according to any suitable standard, including but not limited to Bluetooth, Bluetooth low energy, Wi-Fi and the like.

In addition to communicating data with the gesture controller, the communication unit of the computing device may be operable to communicate with one or more external devices. The communicated data may include control signals. This can enable the motion of the gesture controller to be used to control one or more devices linked to the computing device.

The computing device may comprise a gesture engine. The gesture engine may be integrated into or connected to the processing unit. The gesture engine may comprise or be connected to a gesture library. The gesture engine may be operable in response to actuation of the gesture input means to: record output of the motion sensor and store said output as a control gesture in the gesture library; or compare output of the motion sensor to a previously stored control gesture in the gesture library and output an indication if the output of the motion sensor matches the stored output.

The skilled man will appreciate that in some optional embodiments, a processing unit may be provided on the controller to carry out processing or pre-processing of the output of the motion sensor or the user actuable gesture mode input means. This would however result in an increase in the cost, complexity and power consumption of the controller.

The above controller therefore enables a user to create, store and use their own personalised control gestures. This can provide a user with greater satisfaction. Additionally, this can allow a user to compensate for difficulties in performing pre-set gestures. Such personalisation also inhibits the ability of others to use a controller with stored personalised gestures. This can provide a user with a feeling of security and or provide for a fun challenge for others to try to learn how to implement a user's personalised control gestures.

The user actuable gesture mode input means may comprise any suitable input means, including but not limited to push buttons, switches, touch sensors, pressure sensors, optical sensors or the like. In some embodiments, the user actuable gesture mode input means comprises one or more push buttons. In particular embodiments, the user actuable gesture mode input means comprises a single push button.

The user actuable gesture mode input means may be operable to switch the system between one or more modes. In particular, the user actuable gesture mode input means may be operable to switch the system into or out of a gesture record mode where the gesture engine is operable to record output of the motion sensor and store said output as a control gesture in a gesture library. Additionally, the user actuable gesture mode input means may be operable to switch the system into or out of a gesture recognition mode where the gesture engine is operable to compare output of the motion sensor to a previously stored control gesture in the gesture library and output an indication if the output of the motion sensor matches the stored output.

Where the user actuable gesture mode input means comprises multiple different input means or an input means operable to detect multiple different inputs, different inputs may be utilised to select different modes. Where user actuable gesture mode input means comprises a single input, successive actuations of the input means may toggle the system between different modes. Additionally or alternatively, actuation of the user actuable gesture mode input means for different time intervals or for a pattern of different time intervals may switch the system between different modes. In such embodiments, the processing unit may be operable to distinguish between a brief actuation of the gesture mode input means and an extended actuation of the gesture mode input means. In particular, an extended actuation can be defined as actuation exceeding a threshold time interval. The threshold time interval is selected so as to enable the system to distinguish between a brief user input (such a s a button press) and an extended user input (such as holding a button). In one embodiment, brief actuation of the gesture mode input means may reset the cursor position and extended actuation of the gesture mode input means may select gesture record mode and/or recognition mode.

In a further embodiment, modes available for selection by the user actuable gesture mode input means may be determined by a master mode setting. The master mode setting may have a regular mode and a configuration mode. The master mode setting may be selected by use of the user actuable input means or may be selected in response to control inputs made via user input means of the computing device.

In the regular mode, actuation of the user actuable gesture mode input means may switch the system into gesture recognition mode. In the regular mode, the gesture recognition mode may be switched off once actuation of the user actuable gesture mode input means ceases. In this manner, only gestures where the user actuates the user actuable gesture mode input means are compared to stored control gestures. This prevents inadvertent control input by a user.

In the configuration mode, actuation of the user actuable gesture mode input means may switch the system into gesture record mode. In the configuration mode, the gesture record mode may be switched off once actuation of the user actuable gesture mode input means ceases. In this manner, only gestures where the user actuates the user actuable gesture mode input means are stored. This prevents inadvertent storage of control input by a user when recording a gesture.

Where multiple control gestures are recorded, each gesture may be assigned to control a different function of the linked external device.

The controller may comprise a control unit operable to coordinate operation of the controller.

The controller may incorporate feedback means. The feedback means can comprise any one or more of haptic, visual or audio feedback means. In the case of haptic feedback means, the haptic feedback means may comprise a vibration motor. In the case of visual feedback means, the visual feedback means may comprise a display unit and/or one or more illumination means. The illumination means may comprise one or more LEDs. In the case of audio feedback means, the audio feedback means may comprise a buzzer, loudspeaker or the like.

The feedback means may be operable in response to the user actuable gesture mode input means. In this manner, the feedback means may confirm the selection of an operational mode using the user actuable gesture mode input means. The feedback means may be operable in response to the gesture engine. In this manner, the feedback means may provide confirmation that a control gesture has been performed. The feedback provided by the feedback means may vary depending on the particular control gesture performed.

The motion sensor may comprise a 6-axis motion sensor. Such motion sensors may comprise a 3-axis accelerometer with a 3-axis gyroscope. In some embodiments, the motion sensor may comprise a 9-axis motion sensor. Such motion sensors may comprise a 3-axis accelerometer, a 3-axis gyroscope and a 3-axis magnetometer. Beneficially, the provision of the magnetometer enables the motion sensor to compensate for small drifts in the accuracy of the accelerometer and gyroscope over time.

The controller may incorporate a power source. Typically, the power source comprises a battery. The battery may be a rechargeable battery. In some embodiments, the power source may comprise energy scavenging means. Suitable energy scavenging means include but are not limited to piezoelectric, thermoelectric and photoelectric elements.

The controller may be provided in an elongate form. The elongate form may be adapted to resemble a magic wand. The elongate axis of the controller may correspond to an axis along which motion does not correspond to cursor motion and/or where motion corresponds to variation in cursor size.

The computing device may comprise any suitable device, including but not limited to a personal computer, laptop computer, tablet computer or other computer systems, a games console or other gaming system, media player, smartphone or the like. The user actuable input means of the computing device may comprise any suitable input means, including but not limited to push buttons, switches, touch sensors, pressure sensors, optical sensors or the like. The computing device may additionally comprise audio output means. In such embodiments, the audio output means may comprise an integrated loudspeaker and/or a data connection to an external loudspeaker.

According to a second aspect of the present invention there is provided a method of operating a gesture recognition system comprising a gesture controller and a computing device, the method comprising the steps of: monitoring the output of a motion sensor operable to sense motion of the controller using the computing device; monitoring the output of user actuable gesture mode input means provided on the controller using the computing device; providing visual feedback related to the output of the motion sensor on a display unit of the computing device, the visual feedback comprising a cursor on the display unit; and resetting the cursor to an origin position in response to the output of the gesture mode input means.

The method of the second aspect of the present invention may incorporate any or all features of the first aspect of the present invention as desired or required.

DETAILED DESCRIPTION OF THE INVENTION

In order that the invention may be more clearly understood one or more embodiments thereof will now be described, by way of example only, with reference to the accompanying drawings, of which.

Figure 1:
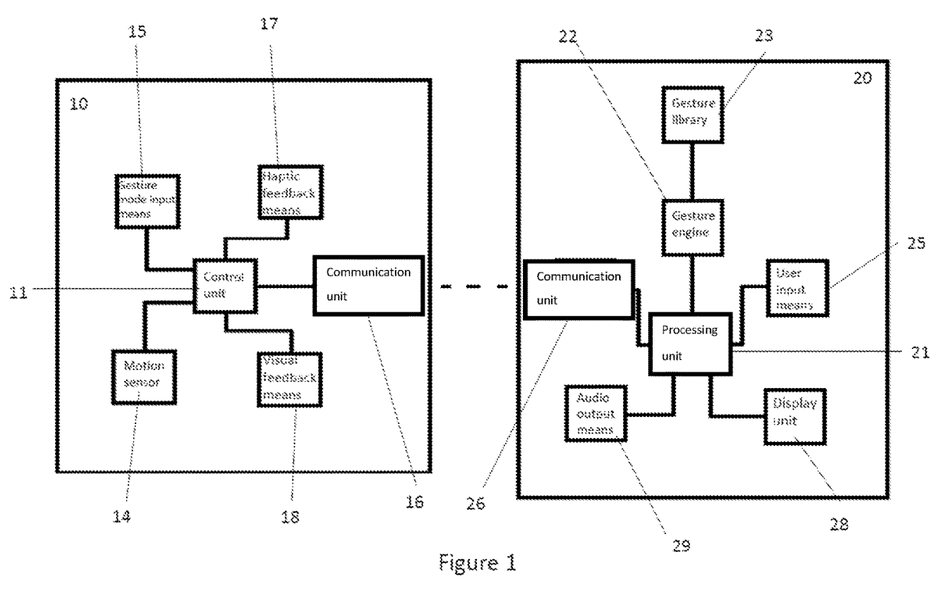
FIG. 1 is a schematic block diagram of an embodiment of a gesture recognition system according to the present invention.

Turning now to FIG. 1, gesture recognition system 1 comprises a gesture controller 10 and a computing device 20. The controller 10 is designed to be held by a user such that motion of the controller 10 by the user enables gesture control inputs to be made to computing device 20. In response to motion corresponding to particular control gestures operation of the computing device 20 or additional devices linked to computing device 20 can be altered.

Figure 2:
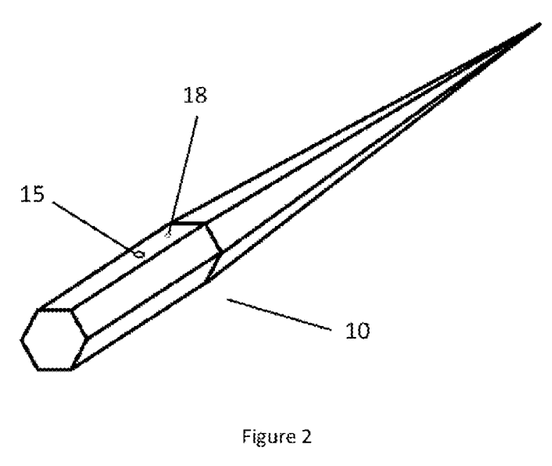
FIG. 2 is an illustration of the external form of one possible gesture controller of a gesture recognition system according to the present invention.

Turning now to the controller 10, this comprises a motion sensor 14, a user actuable gesture mode input means 15 and a communication unit 16. Optionally, as is shown in FIG. 1, the operation of the components of the controller 10 can be coordinated by a control unit 11. Additional optional components of the controller include haptic feedback means 17 and visual feedback means 18. An exemplary embodiment of controller 10, in the form of an elongate wand, with user actuable gesture mode input means 15 in the form of a push switch is illustrated at FIG. 2.

Typically, the user actuable gesture mode input means 15 comprise a push switch or the like. A suitable motion sensor 15 is a 9 axis motion sensor comprising a 3-axis accelerometer, 3-axis gyroscope and a 3-axis magnetometer. In embodiments where they are provided, the haptic control means may comprise a vibratory motor and the visual feedback means may comprise one or more LEDs.

Turning now to the computing device 20 this comprises a communication unit 26 operable to communicate data with the communication unit 16 of the controller 10. The device 20 further comprises a processing unit 21, a gesture engine 22, a gesture library 23 user input means 25, plus display unit 28 and, optionally, audio output means 29. In some embodiments, the gesture engine and gesture library may be integrated into processing unit 21.

The communication units 16, 26 are typically operable to communicate via a standard wireless communication link such as Bluetooth low energy. The communication units 16, 26 are operable to enable the output of the motion sensor 14 and the gesture mode input means 15 to be communicated to the processing unit 21.

In use, the motion sensor 14 is operable to sense motion of the controller 10 and output a signal in response thereto. The output of the motion sensor 14 is passed to processing unit 21 via communication units 16, 26. The output of the motion sensor 14 is then processed by processing unit 21, gesture engine 22 and gesture library 23. In a gesture record mode, the gesture engine 22 is operable to record output of the motion sensor and store said output as a control gesture in a gesture library 23. In a gesture recognition mode, the gesture engine 22 is operable to compare the output of the motion sensor 14 to a previously stored control gesture in the gesture library 23 and output an indication if the output of the motion sensor 14 matches the stored output.

The switching of the mode of the gesture engine 22 is controlled by the user actuable gesture mode input means 15 in combination with the computing device. In particular, the output of the gesture mode input means 15 is passed to processing unit 21 via communication units 16, 26. The output of the gesture mode input means 15 is then processed by processing unit 21 to determine the operational mode of the system. Typically, as shown in FIG. 2, the gesture mode input means 15 is a single push switch. In such embodiments, the processing unit may be operable to distinguish between a brief actuation of the gesture mode input means 15 and an extended actuation of the gesture mode input means. In this context, an extended actuation can be defined as actuation exceeding a threshold time interval. The threshold time interval is set so as to distinguish between a user pressing the push switch once and a user holding the push switch.

Where the output of the motion sensor 14 matches a stored control gesture, the gesture engine 22 can output, via processing unit 21, a signal indicative of the control gesture. This can control the operation of the computing device 20 or other device linked to the computing device 20. Optionally, the output of the gesture engine 22 can trigger the activation of haptic and visual feedback means 17, 18.

In one embodiment, the controller 10 has a master mode setting which in turn controls the operation of the user actuable gesture mode input means 15. The master mode settings can comprise a configuration mode and a regular mode. The master mode settings can be controlled using the user inputs 25 of the linked device 20.

In configuration mode, extended actuation of the user actuable gesture mode input means 15 switches the system 1 into gesture record mode. Gesture record mode is then switched off once actuation of the user actuable gesture mode input means 15 ceases. Where the user actuable gesture mode input means 15 are a push switch a user can thus control the start and end of the recording of a control gesture by pressing or releasing the push switch 15. The user can record as many or as few gestures as required. Recorded gestures can be allocated to particular actions of the device 20 by using input means 25 in conjunction with display screen 28.

Once sufficient control gestures are stored, the controller 10 can be switched to regular mode from configuration mode. This can be achieved using the user inputs 25 of the linked device 20.

In regular mode, extended actuation of the user actuable gesture mode input means 15 switches the system 1 into gesture recognition mode. Gesture recognition mode is then switched off once actuation of the user actuable gesture mode input means 15 ceases. Where the user actuable gesture mode input means 15 are a push switch, a user can thus control the start and end of a control gesture by pressing or releasing the push switch 15. As such, only gestures where the push switch 15 is pressed are recognised, preventing accident control input due to other motion of the controller 10.

In use, the display unit 28 is operable in response to processing unit 21 to provide visible feedback on the motion sensor 14 output. The feedback is in the form of a cursor 31. Typically, as shown in the screen layout 30 of FIG. 3, the cursor can be displayed within a gesture panel 32 on the display unit 28. Movement of the cursor 31 within gesture panel 32 is in response to the output of the motion sensor 14.

Figure 3:
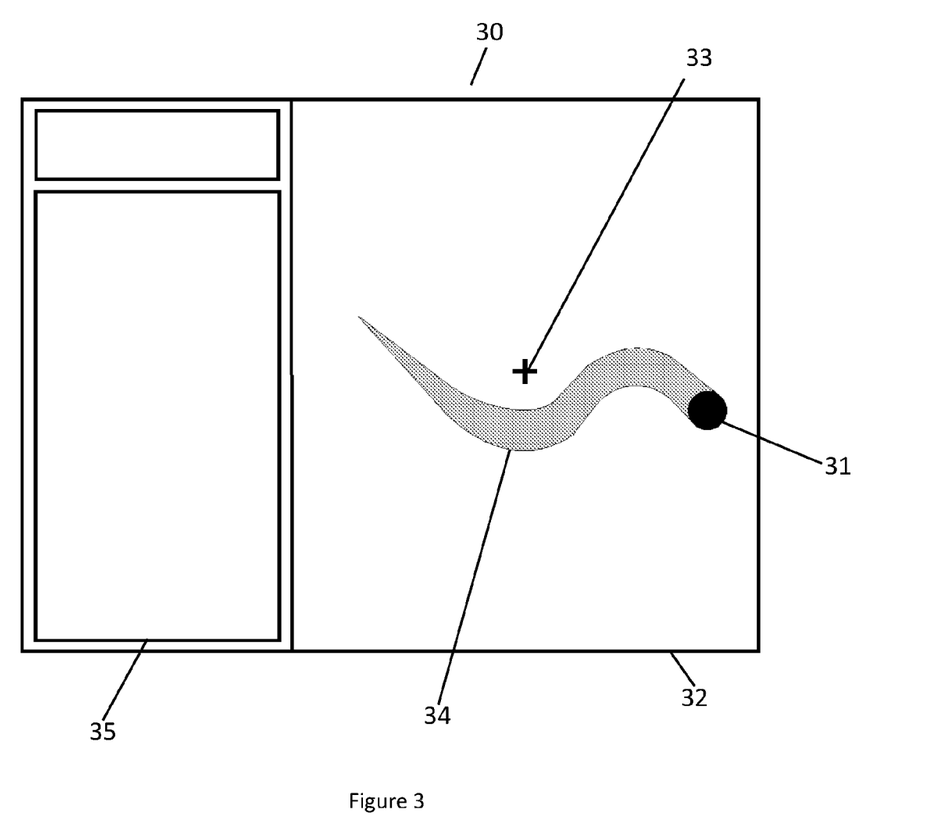
FIG. 3 is a schematic diagram of a display layout of a computing device of the gesture recognition system according to the present invention.

The initial cursor 31 position is at origin 33. Subsequent output of the motion sensor 14 results in corresponding movement of the cursor 31 within gesture panel 32. In this context, the orientation of the controller 10 when the cursor is at origin 33 is defined as an origin orientation. in this manner, the user can readily associate motion of controller 10 with motion of cursor 31. Since the gesture panel is a two dimensional space, in some embodiments motions of the controller 10 along one axis are ignored with regard to cursor motion. In other embodiments, motions of the controller 10 along one axis result in the size of cursor 31 increasing or decreasing. Typically, in elongate embodiments such as that shown in FIG. 2, the ignored or scale varying dimension corresponds with the elongate axis of the controller 10.

Using the controller 10 over an extended period or resuming use after dropping or releasing the controller 10 may result in the user being unsure of the cursor 31 position and/or unable to coordinate motion of the cursor 31 within the window with their gestures. As such, in the present invention, the system is operable to enable the cursor 31 position to be reset to the origin 33 in response to a reset input via gesture input means 15. In addition to resetting the cursor 31 position, the system can define the current orientation of the controller 10 as a new origin orientation. This ensures that the users subsequent gestures readily map on to the cursor motion on gesture panel 32.

In response to extended actuation of the user actuable gesture mode input means 15, the display unit may be operable to display a cursor trail 34 as well as cursor 31. The cursor trail 34 corresponds to the position of the cursor 31 during the period of extended actuation. In this manner, the user is provided with visual feedback of the cursor motion (and hence the corresponding controller 10 motion during gesture input/gesture recordal. In this manner the user can assess the accuracy of the gesture via the display unit 28 during or immediately after performing the gesture.

In one particular implementation, the computing device 20 is provided with a coding application. The coding application may be operable to enable the user to generate control scripts to control operation of the computing device 20 or other devices linked to the computing device. The control scripts can optionally be displayed on a coding panel 35 alongside gesture panel 32. The control scripts may be displayed in text form only or in a combination of text and icons. The icons can correspond to particular gestures in the gesture library 23. Typically, the icon comprises a visual representation of the corresponding the gesture motion. This can readily enable users to assign stored gestures to particular control inputs for the computing device 20 or any further linked devices.

The control scripts can be written using input means 25. Once control scripts are written the user can switch the wand 10 to configuration mode and activate gesture recognition mode to record a control gesture. The visual and/or haptic feedback means 17, 18 can be activated during or after recording to confirm operation as required. The recorded control gesture can then be assigned to a control script using the user inputs 25 and display screen 28.

Once sufficient control gestures are recorded and assigned, the user may switch the wand 10 back to regular mode. As required the user can activate gesture recognition mode using switch 15 and perform a control gesture. In response, the gesture engine 22 will match the gesture to a stored control gesture. Additionally, haptic feedback means 17 can be activated to provide haptic feedback that the gesture is recognised. Visual feedback means 18 can also be activated to confirm recognition.

The processing unit 21 will subsequently be operable to run the assigned control script on computing device 20. Accordingly, user gestures can control the operation of computing device 20 and any linked devices.

In one implementation, the systems can provide an educational tool. In such an implementation, the controller 10 may be in the form of a wand (as in FIG. 2). The user can assign gestures to particular display outputs such as moving objects displayed within gesture panel 32 or causing the display/deletion of objects displayed within gesture panel 32. A user can thus give the impression of performing a magic spell on the device 20. Since the gestures are recorded by a user themselves they can be sure that they are able to perform the gesture. Additionally, it can then provide a challenge for other users to replicate the same control gesture and thus perform the magic spell.

In further implementations, the computing device 20 is connected to other devices such as one or more lighting units HVAC (heating, ventilation and cooling) units, audio systems or the like. Gestures recognised by the computing device 20 can thus control the external devices. Accordingly, the user can readily vary lighting, environmental conditions or external audio (such as music) by gestures when holding controller 10.

In some implementations, where a control gesture in gesture recognition mode is not matched by the gesture engine 22 with any stored control gestures in the gesture library 23, the haptic feedback means 17 can be activated to provide haptic feedback that the gesture is not recognised and the visual feedback means 18 can also be activated to confirm failure of recognition. Typically, the haptic feedback means 17 may apply different vibrational modes to the controller in response to recognition/non-recognition of control gestures and the visual feedback means 18 may illuminate in a different colour or in a different pulsing pattern in response to recognition/non-recognition of control gestures.

The above embodiments are described by way of example only. Many variations are possible without departing from the scope of the invention as defined in the appended claims.

The invention claimed is:

1. A gesture recognition system comprising a gesture controller and a computing device:
    the gesture controller comprising:
        a motion sensor operable to sense motion of the gesture controller and output a signal indicative thereof;
        a user actuable gesture mode input means; and a communication unit operable to communicate the output of the motion sensor and an output of the gesture mode input means to the computing device; and the computing device comprising:
a communication unit operable to receive the output of the motion sensor and the output of the gesture mode input means from the communication unit of the gesture controller;
a processing unit operable to process the output of the motion sensor and the output of the gesture mode input means; and
a display unit operable in response to the processor to provide visual feedback related to the output of the motion sensor, the visual feedback comprising a cursor on the display unit and wherein the cursor can be reset to an origin position in response to the output of the gesture mode input means, wherein the display unit is operable to display a cursor trail corresponding to a position of the cursor during a period of extended actuation of the gesture mode input means.

2. A gesture recognition system as claimed in claim 1 wherein the orientation of the gesture controller when the cursor is at rest is defined as an origin orientation.

3. A gesture recognition system as claimed in claim 2 wherein motions of the gesture controller along one axis with respect to the origin position do not generate corresponding cursor motion on the display unit and/or wherein motions of the gesture controller along one axis with respect to the origin position correspond to variation in the size of the displayed cursor.

4. A gesture recognition system as claimed in claim 1, wherein the communication unit of the computing device is operable to communicate with one or more external devices.

5. A gesture recognition system as claimed in claim 1 wherein the computing device comprises a gesture engine and a gesture library.

6. A gesture recognition system as claimed in claim 5 wherein the gesture engine is operable in response to actuation of the gesture mode input means to: record output of the motion sensor and store said output as a control gesture in the gesture library; or compare output of the motion sensor to a previously stored control gesture in the gesture library and output an indication if the output of the motion sensor matches the stored output.

7. A gesture recognition system as claimed in claim 1 wherein the user actuable gesture mode input means comprise one or more push buttons, switches, touch sensors, pressure sensors, or optical sensors.

8. A gesture recognition system as claimed in claim 1 wherein the user actuable gesture mode input means are operable to switch the system into or out of a gesture record mode where the gesture engine is operable to record the output of the motion sensor and store said output as a control gesture in a gesture library.

9. A gesture recognition system as claimed in claim 1 wherein the user actuable gesture mode input means are operable to switch the system into or out of a gesture recognition mode where the gesture engine is operable to compare the output of the motion sensor to a previously stored control gesture in the gesture library and output an indication if the output of the motion sensor matches the stored output.

10. A gesture recognition system as claimed in claim 1 wherein the user actuable gesture mode input means comprises a single input, and successive actuations of the input means toggle the system between different modes of actuation of the user actuable gesture mode input means for different time intervals or for a pattern of different time intervals switches the controller between different modes.

11. A gesture recognition system as claimed in claim 1 wherein the processing unit is operable to distinguish between a brief actuation of the gesture mode input means and the extended actuation of the gesture mode input means.

12. A gesture recognition system as claimed in claim 11 wherein the extended actuation is defined as actuation exceeding a threshold time interval.

13. A gesture recognition system as claimed in claim 11 wherein the brief actuation of the gesture mode input means resets the cursor position and the extended actuation of the gesture mode input means selects a gesture record mode and/or a gesture recognition mode.

14. A gesture recognition system as claimed in claim 1 wherein modes available for selection by the user actuable gesture mode input means are determined by a master mode setting and the master mode setting has a regular mode, and wherein actuation of the user actuable gesture mode input means switches the system into gesture recognition mode; and wherein the master mode setting has a configuration mode, and wherein actuation of the user actuable gesture mode input means switches the system into gesture record mode.

15. A gesture recognition system as claimed in claim 1 wherein the gesture controller incorporates a feedback means operable in response to the user actuable gesture mode input means.

16. A gesture recognition system as claimed in claim 1 wherein the gesture controller is provided in an elongate form adapted to resemble a magic wand.

17. A gesture recognition system as claimed in claim 1 wherein the computing device comprises a personal computer, laptop computer, tablet computer, games console, media player, or smartphone.

18. A method of operating a gesture recognition system comprising a gesture controller and a computing device, the method comprising the steps of:
monitoring an output of a motion sensor operable to sense motion of the controller using the computing device;
monitoring an output of user actuable gesture mode input means provided on the controller using the computing device;
providing visual feedback related to the output of the motion sensor on a display unit of the computing device, the visual feedback comprising a cursor on the display unit; and
resetting the cursor to an origin position in response to the output of the gesture mode input means, wherein the display unit is operable to display a cursor trail corresponding to a position of the cursor during a period of extended actuation of the gesture mode input means.

19. A method as claimed in claim 18 wherein the orientation of the gesture controller when the cursor is at rest may be defined as an origin orientation.

20. A method as claimed in claim 19 wherein motions of the gesture controller along one axis with respect to the origin position do not generate corresponding cursor motion on the display unit and/or motions of the gesture controller along one axis with respect to the origin position correspond to variation in the size of the displayed cursor.

21. A method as claimed in claim 18 wherein the computing device is operable to distinguish between a brief actuation of the gesture mode input means and the extended actuation of the gesture mode input means.

22. A method as claimed in claim 21 wherein the extended actuation is defined as actuation exceeding a threshold time interval.

23. A method as claimed in claim 21 wherein the brief actuation of the gesture mode input means resets the cursor position and the extended actuation of the gesture mode input means selects a gesture record mode and/or a gesture recognition mode.

24. A method as claimed in claim 18 wherein the system is operable to be switched into or out of a gesture record mode where a gesture engine is operable to record the output of the motion sensor and store said output as a control gesture in a gesture library.

25. A method as claimed in claim 18 wherein the gesture controller is operable to be switched into or out of a gesture recognition mode where the gesture engine is operable to compare the output of the motion sensor to a previously stored control gesture in the gesture library and output an indication if the output of the motion sensor matches the stored output.

26. A method as claimed in claim 18 wherein modes available for selection are determined by a master mode setting, the master mode setting having a regular mode, wherein the gesture controller is operable to be switched into or out of gesture recognition mode and a configuration mode, wherein the controller is operable to be switched into or out of gesture record mode.

* * * * *